March 15, 1938.   P. JORDAN   2,111,289
ELECTRICAL APPLIANCES, PARTICULARLY BRACKETS
Filed Dec. 9, 1936   2 Sheets-Sheet 1
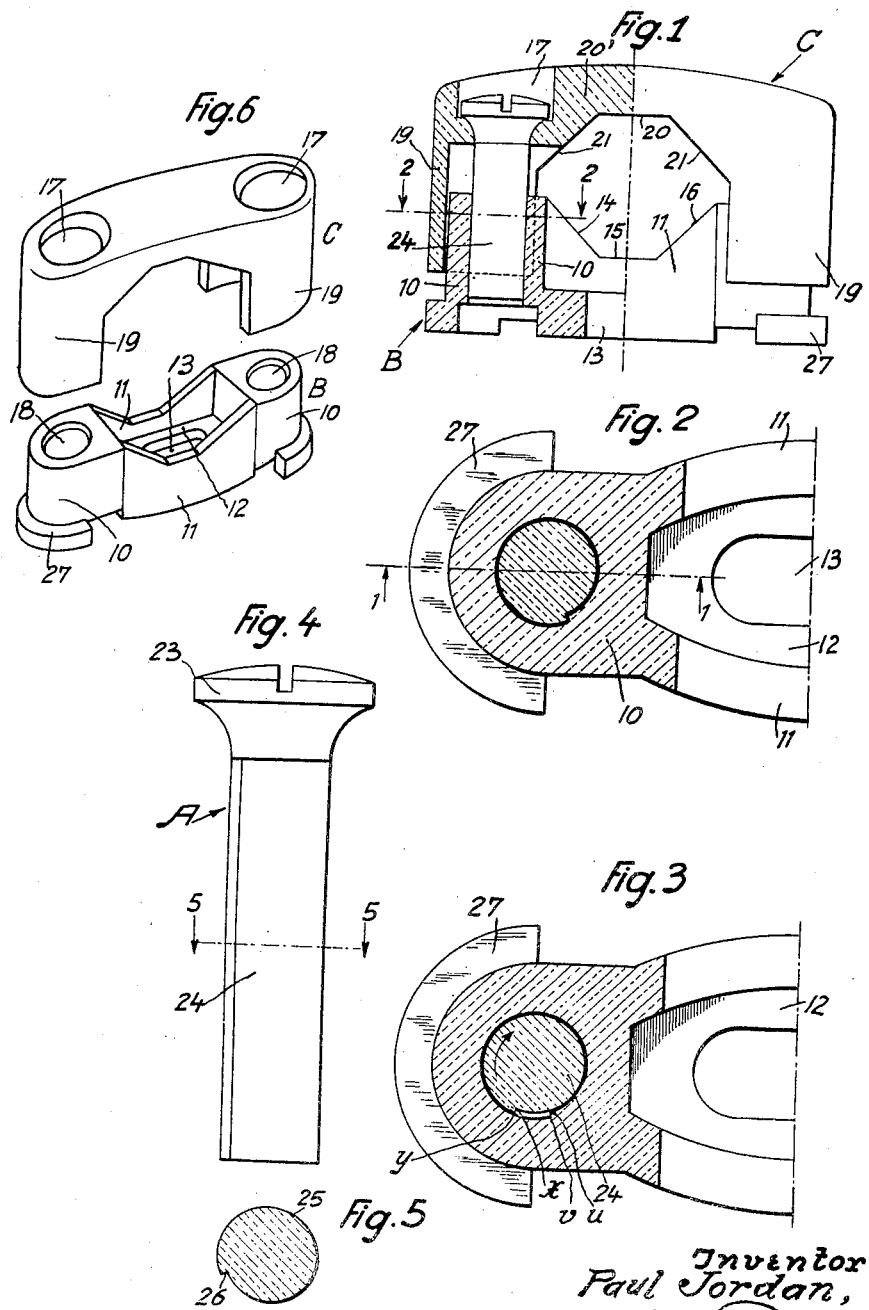
Inventor:
Paul Jordan,
Attorneys

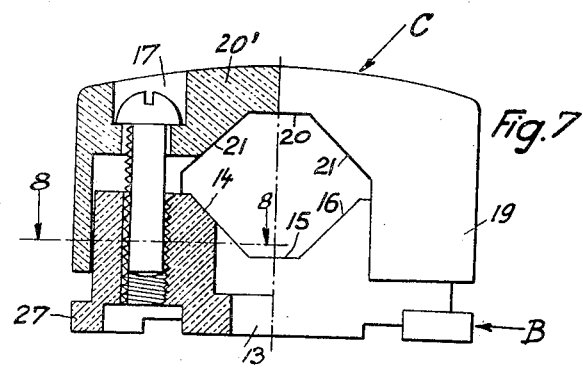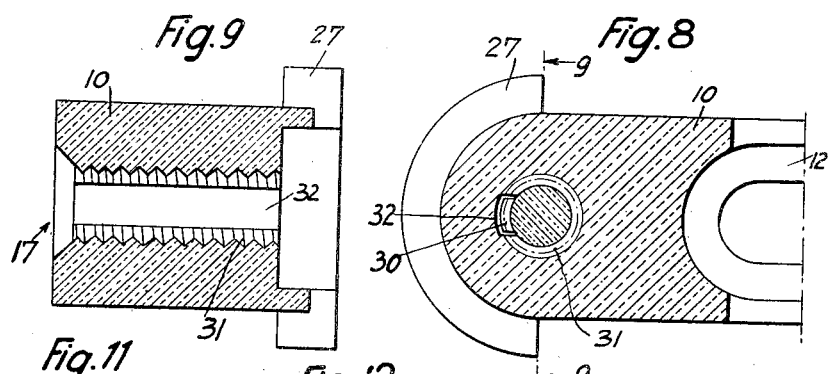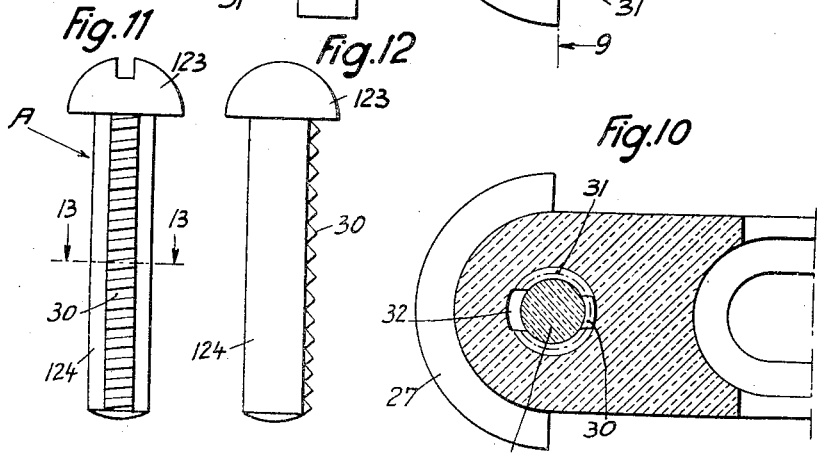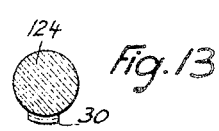

Patented Mar. 15, 1938

2,111,289

UNITED STATES PATENT OFFICE 2,111,289

ELECTRICAL APPLIANCES, PARTICULARLY BRACKETS

Paul Jordan, Berlin-Steglitz, Germany

Application December 9, 1936, Serial No. 115,053
In Germany December 12, 1935

9 Claims. (Cl. 173—314)

My invention relates to electrical appliances and, more particularly, to a bracket for supporting electric conduits or cables of different diameters on walls or ceilings.

In electrical appliances comprising a base member and a cap of insulating material clamped thereto by a bolt, such as plug sockets, switches, brackets etc., it happens frequently that the cap breaks when the bolt is screwed down too tightly as the common insulating materials, such as fibre and porcelain, are comparatively brittle and liable to crack if subjected to excessive pressure. On the other hand, the bolt is liable to get loose unless it be properly tightened.

One object of my invention is the provision of an improved electrical appliance in which the pressure exerted by the bolt on the cap is independent of the degree to which the bolt is tightened. This is achieved by the use of a threadless bolt which extends through the cap into a bore of the base member and has a spiral cross-sectional profile. The bore has a similar profile and thus permits ready insertion of the bolt in axial direction; but when the bolt is turned through a partial revolution, it will be firmly clamped to the base member irrespective of its axial position. Therefore, it does not exert undue pressure on the cap.

My invention affords further important advantages when applied to a bracket for supporting electric conduits of different diameters on walls or ceilings of buildings. Such brackets comprise a base member having a recess for insertion of the conduit, a cap holding the conduit in place and attached to the base member by one or two bolts extending through holes of the cap and screwed into tapped bores provided in the base member. The base member has a foot portion which is first attached to the wall in any suitable manner. Then, the operator inserts the cable or conduit, puts the cap in place thereon and inserts the bolts using a screw driver to tighten them. Obviously, the length of the bolts and of the tapped bores must be so chosen as to permit ready engagement when conduits of the greatest diameter are to be attached. Therefore, when cables of the smallest diameter are used, it requires considerable time to turn the bolts all the way down until they are tightened and experience has shown that this is a tiresome and time-consuming operation. When using the threadless bolts of a spiral cross-sectional contour, the operator may insert the bolts axially up to the fullest possible depth with one hand while holding the cap in place with the other hand and may then use his screw driver to turn the bolts through a partial revolution thus tightening them in place. In this manner, the assembly of the electric service plant is greatly facilitated.

When the axial pressure exerted by the bolt on the cap is a factor of minor importance, the advantage of easy and quick assembly may be attained by the use of bolts of other shape provided the bolt can be axially inserted into its associated bore without the use of a tool and can be then tightened in position by a partial rotation. Thus, the bolt may be formed with a row of cam teeth and the bore may be provided with internal threads and with an axially extending groove. When the bolt is inserted in the bore to proper depth, the row of cam teeth enters the groove. The bolt may then be tightened in any desired position by a partial turn causing the cam teeth to enter the threads.

A further object of my invention is the provision of an electrical appliance of the type above indicated wherein the bolt may be made of insulating material by a simple and economical process. In the manufacture of electrical appliances from insulating material the elements thereof are usually pressed in suitable matrices. It is not readily possible, however, with this process to form threads and, therefore, the threads must be cut subsequently to the pressing operation which involves additional expense. Moreover, the use of threads on elements made of insulating material is undesirable because threads reduce the mechanical strength, particularly the tensile strength considerably. For this reason, it has not been possible to use threaded bolts made of insulating material. The present invention, however, affords the possibility of using insulating material not only for the base member and for the cap but also for the bolt or bolts when the latter are free from threads and have a cross-sectional contour of spiral shape since bolts of this form may be readily pressed without requiring any subsequent finishing operation.

My invention will be described hereinafter in its application to a bracket for supporting electric conduits. Two different embodiments of such a bracket are illustrated in the accompanying drawings, in which Fig. 1 is an elevation, partly in section along line 1—1 of Fig. 2;

Fig. 2 is the section taken along line 2—2 of Fig. 1, with the bolt being in loose position, on enlarged scale;

Fig. 3 is the same view as Fig. 2, the bolt being clamped in place;

Fig. 4 is an elevation of the bolt shown on an enlarged scale;

Fig. 5 is the section taken along line 5—5 of Fig. 4;

Fig. 6 is an isometric exploded view of the base member and the cap shown in Fig. 1;

Figs. 7 to 13 illustrate another embodiment,

Fig. 7 being a view similar to Fig. 1,

Figs. 8 and 10 being the section taken along line 8—8 of Fig. 7 with the bolt in loose and in fixed position;

Fig. 9 is the section taken along line 9—9 of Fig. 8;

Fig. 11 is an elevation of the bolt;

Fig. 12 a side view and

Fig. 13 the section taken along line 13—13 of Fig. 11.

In Fig. 1, the base member is designated by B as a whole. It comprises two spaced bosses 10 of substantially semi-circular cross-section which are interconnected by two slightly curved upright walls 11 and by a horizontal bottom wall 12 thus forming a box-shaped structure. The bottom wall is provided with an elongated slot 13 affording passage to a bolt or the like, and comprising with the wall 12 a means for the attachment of the base member B to a wall or a ceiling. Each of the two bosses 10 is provided with a bore 18 extending perpendicularly to the bottom wall 12 and with a foot portion 27.

The two side walls 11 are recessed. The edges 14, 15 and 16 of the recess constitute a seat for the electric cable or conductor the diameter of which may largely vary.

The cap member designated by C as a whole comprises a slightly curved top 20 provided with two undersunk holes 17 in registry with the bores 18 and two downwardly extending skirts 19 adapted, when the cap C is put on the base member B, to surround the bosses 10 and to be guided thereon thus preventing the cap from assuming an askew position. The top 20' is provided with a recess providing for two slanting edges 21 and a horizontal edge 20. Thus it will appear that the edges 14, 15, 16 and 20, 21 constitute a hexagonal seat for the cable or conductor.

The undersunk holes 17 provide seats for the heads 23 of the bolts designated by A as a whole which extend into the bores 18.

A cross-section of the shaft 24 of the bolt A is shown in Fig. 5. The contour of the cross-section is a spiral 25, the ends of which are connected by a radial line 26. All longitudinally extending surface elements of the shaft 24 are straight and parallel.

The bore 18 has a similar contour as the bolt A. In Fig. 3 the bolt is shown in clamped position. It will be noted that it has a full surface contact with the walls of the bore and is thus firmly held in position by frictional engagement.

As will appear from Fig. 3, the contour of the bore and that of the bolt are overlapping sections of the same spiral curve, the contour of the bore extending from the point U to the point V and the contour of the bolt extending from X to Y. All of these points, however, lie on the same spiral curve. Obviously, the radius of the point Y is smaller than that of the point V. Similarly, the radius of X is smaller than that of U. Therefore, the bolt is loose in the bore when assuming the angular position shown in Fig. 2. This is the position in which the operator inserts the bolts with his one hand while holding the cap C tightly on the inserted cable with his other hand. Then, after the bolts have been introduced into the bores 18 to their full depth, the operator uses a screw driver turning the bolts to the position shown in Fig. 3 in the direction of the arrow, whereby the bolts are firmly clamped in place. It will be apparent that the torque applied to the bolts by means of the screw driver is quite independent of the stress set up in the cap. Therefore, the operator may tighten the bolts as much as he desires without risking a fracture of the cap C. This is a substantial advantage over the common use of threaded bolts.

Another advantage is the simplicity of the assembling operation requiring but a short rotation of the bolt.

A third advantage is the possibility of making the bolt of a comparatively brittle insulating material, such as fibre or a condensation product by way of a simple pressing operation, or of a ceramic material.

In Figs. 7 to 13 I have shown a modification of my invention which differs from the one above described mainly by the use of different connecting means. In this embodiment, the bolt A comprises a head 123 provided with a slot for insertion of a screw driver and a shaft 124 of circular cross-section provided with a longitudinal row of cams 30, each cam being formed by a ridge slightly inclined to a plane positioned at right angles to the axis of the bolt. The bore 17 is provided with an internal thread 31 of the same inclination as that of the cams 30 and with an axially extending groove 32 intersecting the thread 31. The groove is so dimensioned that the bolt may be inserted to the desired depth by hand if it assumes the angular position shown in Fig. 8. When the bolt is then turned by means of a screw driver, the cams 30 enter the threads 31 of the tapped bore 17, the bolt acting as a screw drawing the cap C tightly towards the base B. The bolt may then assume the position shown in Fig. 10, for instance. Hence, the advantage of the simplicity of the assembling operation peculiar to the above described embodiment is also obtained with this modification.

As the base member and the cap are substantially the same as those shown in Figs. 1 and 2, it is not necessary to describe them in detail. However, the same reference numerals are applied to the corresponding parts. The spirally profiled shaft 24 of the bolt A of the first described embodiment constitutes a cam and, therefore, it is a common feature of both embodiments that the bolt may be axially introduced into the bore of the base member to a varying depth and may then be firmly clamped in position by a partial rotation producing a camming action.

While my invention is described hereinabove as applied to a bracket of the type having two bolts, it is to be understood that it is equally applicable to brackets having but one bolt and in some of its aspects even to other electrical appliances such as plug sockets, switches and the like. Also, it is to be understood that while I prefer to make the bolts of insulating material, particularly the bolt shown in Figs. 4 and 5, some of the advantages of my invention may be also attained with bolts made of metal. Furthermore, it is obvious that the bracket may be designed for a conductor of standard diameter, although its applicability to conductors of different diameters is one of its outstanding features.

What I claim is:

1. An electrical appliance comprising a base member of insulating material, means in said base adapted to receive a fastening device for securing said base to a supporting structure, and at least one bore in said base adapted to receive a cap securing means, a cap of insulating material adjustably engaging said base, and a threadless bolt extending through said cap and fitting in said bore, the cross-sectional contours of said bore and said bolt being spirals, whereby the bolt may be clamped in position within said bore by a partial rotation irrespective of its axial position.

2. A bracket for supporting electric conduits of different diameters comprising a base member provided with a recess for insertion of the conduit, means in said base adapted to receive a fastening device for securing said base to a supporting structure, said base being provided with at least one bore adapted to receive a cap securing means, a cap telescopically engaging said base, and a bolt formed with at least one cam and extending through said cap into said bore, the walls of said bore being so shaped in conformity with the shape of said cam as to enable said bolt to be axially introduced a varying depth depending on the diameter of said conduit and the telescopic engagement of said cap with said bore and to be firmly clamped in position by a partial rotation of said cam.

3. A bracket for supporting electric conduits of different diameters comprising a base member of insulating material provided with a recess for insertion of the conduit, means in said base adapted to receive a fastening device for securing said base to a supporting structure, said base being provided with at least one bore adapted to receive a cap securing means, a cap of insulating material telescopically engaging said base, and a bolt formed with at least one cam and extending through said cap into said bore, the walls of said bore being so shaped in conformity with the shape of said cam as to enable said bolt to be axially introduced a varying depth depending on the diameter of said conduit and the telescopic engagement of said cap with said bore and to be firmly clamped in position by a partial rotation of said cam.

4. A bracket for supporting electric conduits of different diameters comprising a base member of insulating material provided with a recess for the insertion of the conduit, means in said base adapted to receive a fastening device for securing said base to a supporting structure, said base being provided with at least one bore adapted to receive a cap securing means, a cap of insulating material telescopically engaging said base, and a threadless bolt extending through said cap and fitting in said bore, the cross-sectional contours of said bore and said bolt being spirals, whereby the bolt may be clamped in position within said bore by a partial rotation irrespective of its axial position.

5. A bracket for supporting electric conduits of different diameters comprising a base member of insulating material provided with a foot portion, two bores, and a recess between said bores for the insertion of the conduit, means in said base adapted to receive a fastening device for securing said base to a supporting structure, a cap of insulating material provided with two holes in axial alignment with said bores and with a recess therebetween for engagement over the conduit, means for telescopically guiding said cap relative to said base member in the axial direction of said bores, and two bolts inserted through said holes into said bores, each bolt being formed with at least one cam and the walls of the associated bore having a shape enabling said bolt to be axially introduced a varying depth depending on the diameter of said conduit and the telescopic engagement of said cap with said base and to be firmly clamped in position by a partial rotation of said cam.

6. A bracket for supporting electric conduits of different diameters comprising a base member of insulating material provided with a foot portion, two bores, and a recess between said bores for the insertion of the conduit, means in said base adapted to receive a fastening device for securing said base to a supporting structure, a cap of insulating material telescopically engaging said base and provided with two holes in axial alignment with said bores and with a recess therebetween for engagement over the conduit, means for guiding said cap relative to said base member in the axial direction of said bores, and two threadless bolts inserted through said holes into said bores, the cross-sectional contours of said bores and said bolts being spirals, whereby the bolts may be clamped in position within said bores by a partial rotation irrespective of their axial position.

7. A bracket for supporting electric conduits of different diameters comprising a base member provided with a recess for insertion of the conduit, at least one tapped bore formed with an axially extending groove, and with means adapted to receive a fastening device for securing said base to a supporting structure, a cap provided with a hole, said cap adjustably engaging said base, and a bolt formed with a row of cam teeth and adapted to be inserted through said hole into said bore to a variable depth depending on the diameter of the conduit and the engagement of said cap with said base and to be clamped in position by a partial rotation causing said cam teeth to engage the thread of said bore.

8. An electrical appliance comprising a base member of insulating material provided with at least one bore adapted to receive a cap securing means, a cap of brittle insulating material adjustably engaging said base, and a threadless bolt extending through said cap and fitting in said bore, the cross-sectional contours of said bore and said bolt being spirals, said bolt being secured in said bore by a partial rotation of said bolt without longitudinally displacing the same, whereby rotation of said bolt produces no additional stress on the cap of brittle insulating material.

9. An electrical appliance comprising a base member of insulating material provided with at least one bore adapted to receive a cap securing means, a cap of brittle insulating material engaging said base, and a threadless bolt extending through said cap and fitting in said bore, the cross-sectional contours of said bore and said bolt being spirals, said bolt being secured in said bore by a partial rotation of said bolt without longitudinally displacing the same, whereby rotation of said bolt produces no additional stress on the cap of brittle insulating material.

PAUL JORDAN.